June 24, 1969
R. L. HARTWIG
3,451,510
METERING SHOCK ABSORBER WITH SNUBBING MEANS
AND SNUB RELEASE MEANS
Filed Jan. 22, 1968
Sheet 1 of 2
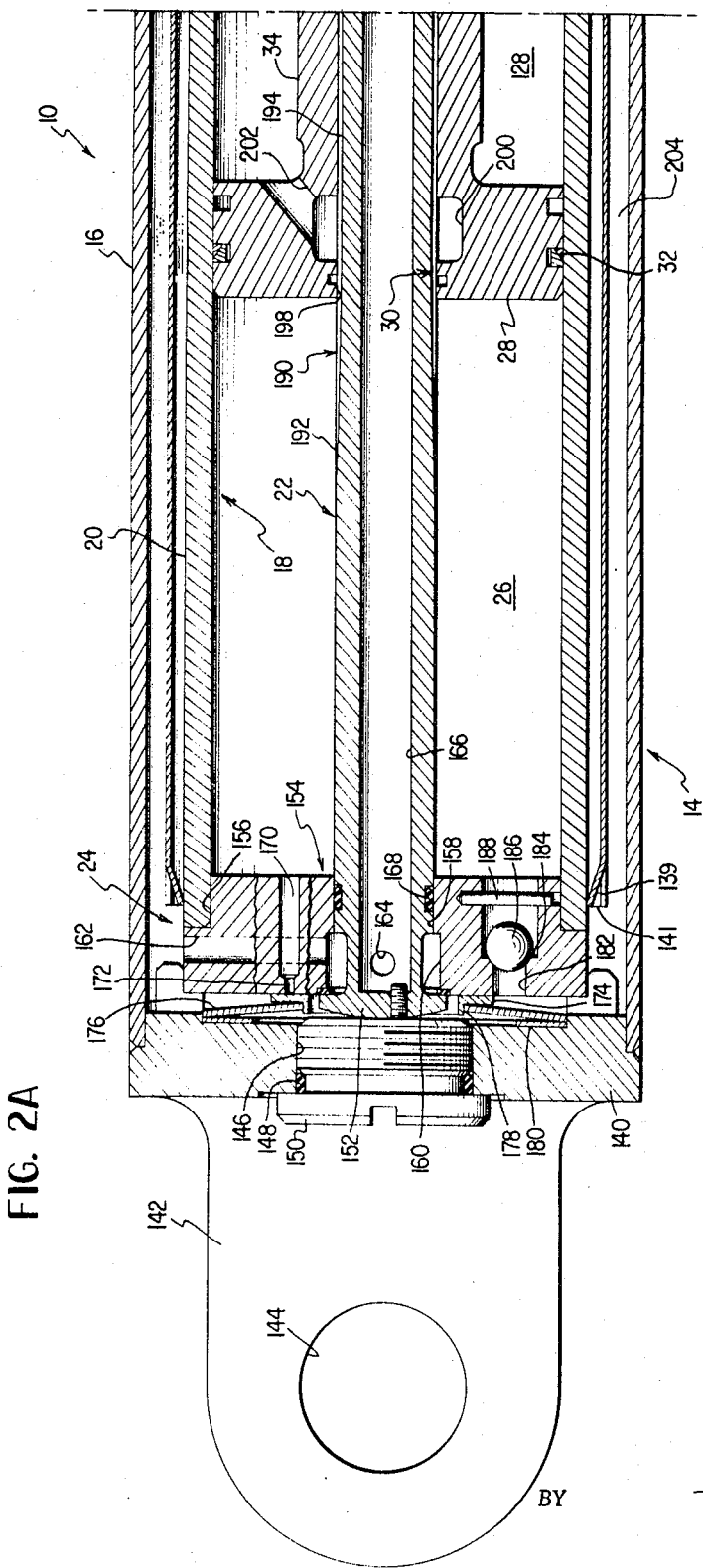
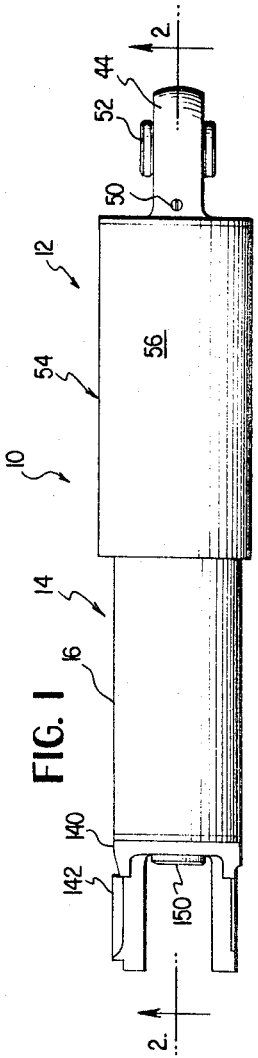
INVENTOR
ROBERT L. HARTWIG
BY *Stephen M. Mihaly*
ATTORNEY

United States Patent Office 3,451,510
Patented June 24, 1969

---

3,451,510
METERING SHOCK ABSORBER WITH SNUBBING MEANS AND SNUB RELEASE MEANS
Robert Louis Hartwig, Portage, Mich., assignor to Pneumo Dynamics Corporation, Cleveland, Ohio, a corporation of Delaware
Filed Jan. 22, 1968, Ser. No. 699,670
Int. Cl. F16d 57/00
U.S. Cl. 188—88         9 Claims

ABSTRACT OF THE DISCLOSURE

This disclosure describes a hydraulic type shock absorber having a metering pin to provide controlled fluid flow across a piston to control the rate of piston movement within a cylinder. Means are provided at one end of the cylinder to snub the piston hydraulically prior to the time the piston physically strikes the cylinder end. Means are also provided to allow the piston to move rapidly away from the snubbed position in order to condition the shock absorber to accommodate a subsequent impact.

Background of the invention

Under certain conditions, such as in suspension systems for track laying military vehicles, it is desirable to provide shock absorbers incorporating square law damping where in the damping vs. the stroke may be controlled and wherein snubbing may be provided at each end of the stroke of the shock absorber. With the ever increasing desire for better performance of the land based vehicle to move across rough terrain at higher speeds, it is necessary to provide a suspension system that will insure true comfort and safety. This may be accomplished by proper suspension springing and proper damping of the system. Since it is necessary to eliminate the jerk that is transmitted through the bump stops usually incorporated on the hull of the vehicle, hydraulic snubbing is preferred.

The perimeters of shock absorbers or such a suspension system are preferably such that after snubbing and high damping, the shock absorbers are able to return to neutral in a minimum amount of lapsed time in order to be ready for the ensuing force functions derived from the contour of the terrain over which the vehicle is travelling. Other requirements for vehicular shock absorbers of the type described are simplicity of the components and the device, a long useful life and substantially maintenance free operation.

Summary

The invention resides in a hydraulic shock absorber of the type having a cylinder assembly in which a piston assembly is reciprocably mounted. A metering pin having one or more metering grooves therein is positioned within the cylinder assembly and passes through the piston. As the piston reciprocates within the cylinder, hydraulic fluid is forced past the piston through the metering grooves to create the damping necessary for the structure to act as a shock absorber.

In order to snub the piston as it approaches one end of the cylinder, the metering groove is tapered so that the fluid can no longer be transmitted across the piston through the metering groove. In addition there is provided in the cylinder wall a fluid path providing communication between the cylinder and an oil accumulator or fluid reservoir. As the piston passes over the fluid path, the path is sealed in order to trap fluid in the end of the cylinder and thereby snub the piston. There is also provided in the end portion of the cylinder, another fluid path communicating between the cylinder and the fluid reservoir. Positioned in the last mentioned fluid path is a valve arrangement adapted to preclude fluid flow through the fluid path when the piston approaches the end of the cylinder and is further arranged to allow fluid flow when the piston recedes from the end of the cylinder. As will be more fully pointed out hereinafter, the use of the valve arrangement allows the piston to recede rapidly from the end of the cylinder and thereby enable the piston to accommodate a subsequent impact.

One of the difficulties of prior art shock absorbers of the type having snubbing means and snub release means at the upper end of the cylinder is that when the piston moves away from the upper end of the cylinder, cavitation occurs in the working chamber between the piston and the upper cylinder end. In accordance with one feature of the invention, cavitation is prevented by the use of a compartmentalized reservoir which operates similar to a siphon to deliver liquid to the working chamber.

It is accordingly an object of the invention to provide a metering shock absorbing system wherein the piston is snubbed as it approaches the end of the cylinder with means being provided for releasing the piston for rapid movement in the opposite direction.

Another object of the invention is to provide a hydraulic shock absorber comprising means for hydraulically snubbing the piston against movement toward the upper end portion of the cylinder and means for releasing the piston for movement away from the upper end portion of the cylinder while precluding cavitation in the working chamber.

Anothed object of the invention is to provide a hydraulic type shock absorber having a telescoping piston-cylinder arrangement equipped with a plurality of fluid paths adjacent one end portion of the cylinder with check valve means in one of the fluid paths to enable the piston to be snubbed in one direction of travel and released for rapid movement in the other direction of travel.

Still another object of this invention is to provide a shock absorber of the telescoping piston-cylinder type equipped with a metering pin extending through the piston and means for snubbing the piston at one end of its movement.

Other objects, advantages and important features of this invention will be apparent from a study of the specification following, taken with the drawings which together describe, disclose, illustrate and show a preferred embodiment of the invention and what is now considered and believed to be the best mode of practicing the principles thereof. Still other embodiments, modifications, procedures or equivalents may occur to those having the benefit of the teachings herein and such other modifications, embodiments, procedures or equivalents are intended to be reserved especially as they fall within the scope and breadth of the subjoined claims.

Brief description of the drawing

FIGURE 1 is a front elevational view of a shock absorber made in accordance with the principles of this invention;

FIGURES 2a and 2b, when taken together, comprise an enlarged longitudinal cross sectional view of the illustration of FIGURE 1, taken substantially along line 2—2 thereof as viewed in the direction indicated by the direction of the arrows.

Figure 2B:
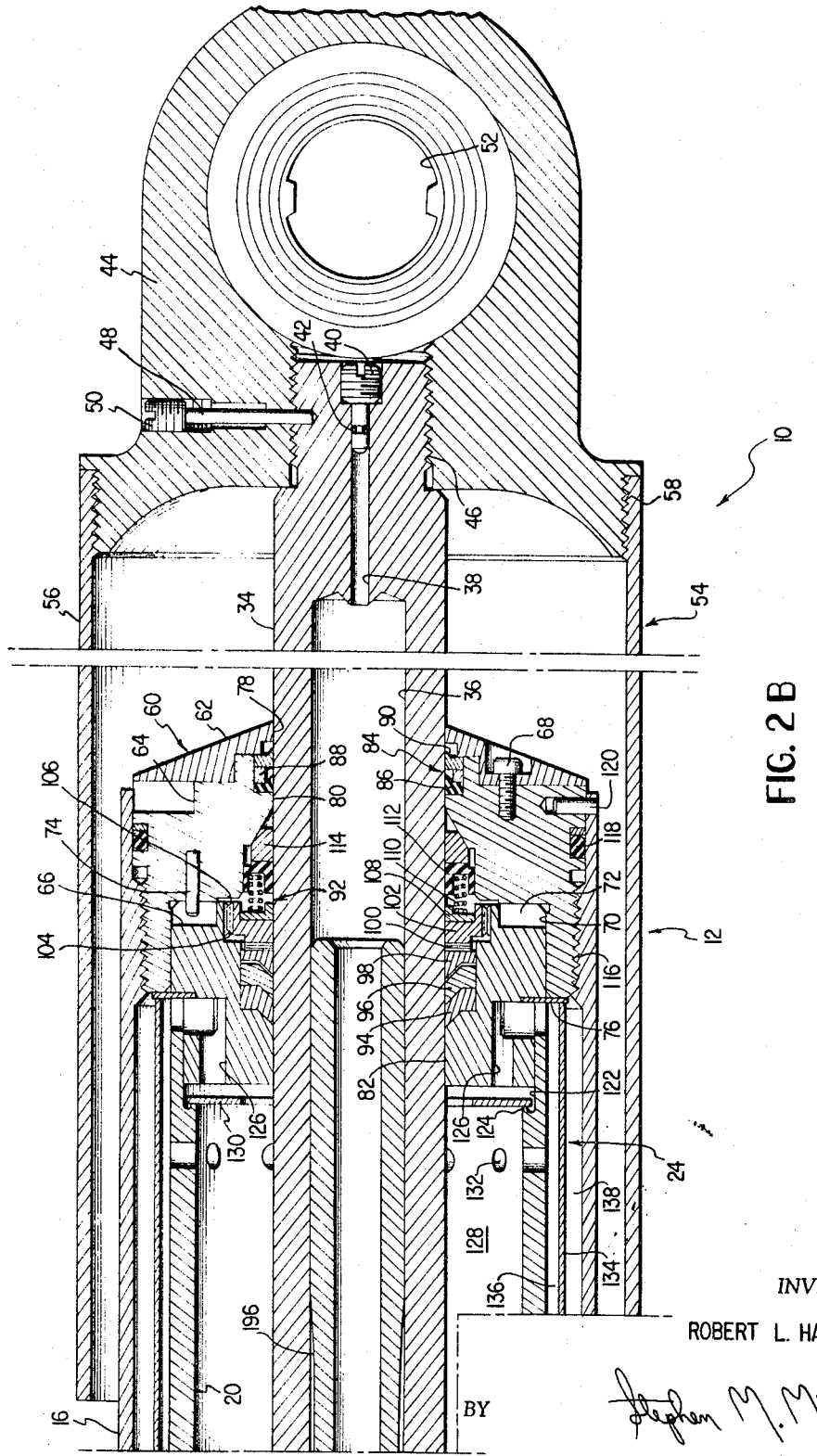

Attention is now directed to FIGURES 1, 2a, and 2b wherein there is shown and illustrated a hydraulic shock absorber 10 having an upper or piston assembly 12 and a lower or cylinder assembly 14. The piston assembly 12 is telescopingly mounted in the cylinder assembly 14 to define the extensible hydraulic shock absorber 10.

The cylinder assembly 14 comprises an outer substantially cylindrical casing 16 and an inner substantially cylindrical casing 18 comprising a substantially cylindrical tube 20. The cylinder assembly 14 is also provided with a substantially centrally disposed metering pin 22 extending generally axially therewith. The outer casing assembly 16 and the inner assembly 18 are disposed in substantially concentric relationship to define an annular reservoir 24 therebetween. The inner assembly 18 and the metering pin 22 define therebetween a working chamber 26 at the cylinder end of the shock absorber 10.

The piston assembly 12 comprises an annular piston member 28 slidably disposed within the inner assembly 18 and having a bore or surface 30 in surrounding relation ship to the metering pin 22. The piston member 28 is therefor slidable within the working chamber 26 and is provided with piston rings 32 on the periphery thereof to sealably cooperate with the tube 20 of the inner assembly 18.

The piston assembly 12 further comprises a piston rod 34 of generally cylindrical configuration rigid with the piston member 28. The piston rod 34 is provided with an axially extending bore 36, constituting an extension of the bore 30, extending into the upper portion thereof to provide clearance for the metering pin 22. The bore 36 comprises a portion 38 of reduced diameter which is sealably closed as by a threaded passage plug 40 and an O-ring packing member 42.

The upper end of the piston rod 34 is secured in a suitable manner to a rod end or upper attached fitting 44 as by the use of a threaded connection 46 cooperating with a transverse lock pin 48 and a set screw 50. The rod end fitting 44 is provided with an eye or plain bearing 52 or the like for attachment to one portion of the vehicle. A shield assembly 54 comprised of a cylindrical tube 56 is secured to the rod end fitting 44 in any suitable manner as by the use of a threaded connection 58.

The upper or rod end of the cylinder assembly 14 is closed by a means of a generally annular cylinder gland assembly 60 comprising an outer gland member 62, an intermediate gland member 64 and an inner gland member 66. The outer gland member 62 is connected to the intermediate gland member 64 by a suitable means such as by a threaded bolt 68. The inner gland member 66 resides in a recess 70 provided in the inner end of the intermediate gland member 64 with suitable flanges 72 and pins 74 cooperating between the gland members 64, 66 to insure retension and torsionable stability. A suitable annular member 76 cooperates between the upper end of the tube 20 to facilitate the connection between the intermediate and inner gland members 64, 66.

Each of the gland members 62, 64, 66 is provided with a substantially centrally located bore 78, 80, 82 respectively to permit passage of the piston rod 34 through the gland assembly 60. Between the bores 78, 80 is a seal assembly 84 comprising a scraper 86 made of Teflon or the like, a scraper spacing ring 88 and a scraper 90 made of metal or the like.

Disposed between the bores 80, 82 is a seal assembly 92 comprised of a high temperature seal set 94, a reed type rod seal 96, a ring seal 98, a plurality of shim washers 100, and a seal retainer 102 held against rotation by a plurality of teeth or splines 104 cooperating with a plurality of similarily configured teeth or splines 106 on the inner gland member 66. The seal retainer 102 and a spring 110 biasing the spring seat 108 away from a wedge seal 112 which is held in place by a spacing ring 114.

The gland assembly 60 is secured to the outer casing 16 by a suitable threaded connection 116 with seals 118 and locking means 120 also being provided. It will be apparent that when the gland assembly 60 is threaded into the outer casing 16, the tube 20 bears against the intermediate and inner gland members 64, 66.

The upper end of the tube 20 is provided with an internal recess 122 which is provided with a reentrant angle to form an annular ridge or lip 124. The inner gland member 66 provides a plurality of passages 126 providing communication between the reservoir 24 and a working chamber 128 between the piston 28 and the gland assembly 60. An annular check valve member 130 is positioned between the lip 124 and the inner gland member 66 to allow and prevent fluid movement through the passages 126 in response to pressure differentials between the working chamber 128 and the reservoir 24 in a manner to be explained more fully hereinafter. Also provided in the tube 20 is a plurality of apertures which also provides communication between the working chamber 128 and the reservoir 24.

An important part of this invention comprises an accumulator tube or divider 134 which separates the reservoir 24 into a first compartment 136 and a second compartment 138. The tube 134 is secured in place by crimping segments 139 of the lower end portion 141 of the tube 134 against the inner cylinder 20. It is noted that the compartment 136 communicates with the compartment 138 adjacent the lower end portion 141 of the tube 134. It is further to be noted that the passages 126 communicate with the first compartment 136 for reasons which will be fully discussed hereinafter.

Referring more particularly to FIGURE 2a, a substantially cylindrical outer end cap 140 is secured to the lower end of the outer casing 16 by welding or the like. The outer end cap 140 comprises a head end or lower attached fitting 142 having an eye or plain bearing 144 therein for attachment to a portion of a vehicle. Provided in the end cap 140 is a threaded opening 146 receiving therein a seal 148 and a bolt 150 engaging a lower end portion 152 of the metering pin 22 to hold the same end position.

An inner cylinder end cap 154 provides a shoulder 156 receiving the lower end of the tube 20 which acts conjointly with the bolt 150 and the lower portion 152 of the metering pin 22 to hold the inner end cap 154 in position. The end cap 154 provides a central bore 158 having an enlarged recess 160 in communication with the reservoir 24 through a radial passage 162. An aperture 164 in the metering pin 22 provides communication between the recess 160 and a central bore 166 of the metering pin 22. A seal 168 prevents communication between the recess 160 and the working chamber 26. It will accordingly be seen that the central bore 166 of the metering pin 22 and the bore 36 of the piston rod 34 comprise a part of the reservoir 24 to accommodate the hydraulic fluid displaced by the piston rod 34 when the shock absorber 10 is in a collapsed position.

The inner end cap 154 also provides a passageway 170 having a small outlet portion 172 which is normally closed by a plate valve 174 operating against a Belleville spring 176. The Belleville spring 176 coacts between a shoulder 178 on the check valve 174 and a spring shim 180 in a manner that will be apparent to one skilled in the art. It will be seen that when the piston 28 approaches the inner end cap 154, an excessive pressure build up within the working chamber 26 is relieved by the passage 170 thereby bleeding the hydraulic fluid from the chamber 26 into the reservoir 24.

The inner end cap 154 also provides a passage 182 communicating between the reservoir 24 and the working chamber 26. The passage 182 provides a shoulder or seat 184 which cooperates with a ball element 186 and a retaining pin 188 to comprise a check valve assembly which operates to allow free fluid flow from the rservoir 24 to the working chamber 26 and which also operates to prevent reverse flow.

Providing a metering arrangement for the shock absorber 10 are a plurality of grooves 190 formed in the external surface of the metering pin 22 in cooperation with the bore 30 of the piston 28. The metering grooves 190 comprise a tapered portion 192 a substantial distance from the end cap 154, an intermediate portion 194 and another tapered portion 196 adjacent the upper end of the tube 20. The bore 30 through the piston 28 comprises a plurality of lands 198 and an annular recess 200 in communication with the working chamber 128 through a passageway 202. It will accordingly be apparent that the shock absorbing characteristics of the device 10 are dependent upon the size and configuration of the metering grooves 190 as long as the piston 28 is disposed adjacent the intermediate portion 194 of the grooves 190.

In order to understand the operation of the shock absorber 10 and particularly the function of the accumulator tube 134, it is necessary to emphasize the shock absorber 10 is disposed in a generally up and down position with the upper attachment fitting 44 being disposed above the lower attached fitting 142. As the piston 28 approaches the inner end cap 154 and passes over the tapered portion 192 of the metering grooves 190, smaller and smaller quantities of hydraulic fluid are bypassed through the metering groove 190, the lands 198, the recess 200 and the passageway 202. There is accordingly an increase in pressure in the working chamber 26 which acts against the plate valve 174 through the outlet 172 of the passageway 170. As the piston 28 passes over the tapered portion 192 of the metering groove 190, the pressure in the working chamber 26 biases the plate valve 174 to an open position so that fluid is bled into the reservoir. At this stage of the operation of the shock absorber 10, the shock absorbing characteristics become dependent on the size and configuration of the passageway 170 and the Belleville 176.

When the piston 28 recedes from adjacent the inner end cap 154, the Belleville spring 176 closes the plate valve 174 so that fluid cannot flow through the passageway 170 into the working chamber 26. Instead, the reduction of fluid pressure in the working chamber 26 allows the ball element 186 to move away from the seat or shoulder 184 to allow fluid communication between the reservoir 24 and the working chamber 26. It will accordingly be apparent that the metering groove 190, the passageway 170 and the plate valve 174 act as snubbing means to retard the rate of piston movement toward the inner end cap 154. It will also be seen that the provision of the ball element 186 constitutes snub release means to allow rapid return of the piston 28 toward a central position within the inner cylinder assembly 18.

As the piston 28 moves toward the gland assembly 60 and passes over the tapered portion 196 of the metering groove 190, smaller and smaller quantities of hydraulic fluid are bypassed through the lands 198 and the metering groove 190. Some of the hydraulic fluid in the working chamber 128 is expelled through the apertures 132 and the passages 126 into the first compartment 136 of the reservoir 24. As the piston 28 passes over the tapered portion 196 of the metering groove 190, there is developed a sufficient pressure differential between the working chamber 128 and the first compartment 136 of the reservoir to move the plate valve 130 to the right as shown in FIGURE 2b to seal the passages 126. Since this acts to seal off one of the escape routes of the hydraulic fluid within the working chamber 128, the pressure therein increases substantially and acts to deaccelerate the piston 28. As the piston 28 passes over the apertures 132, the remaining fluid escape route from the working chamber 128 is sealed thereby hydraulically snubbing the piston 128 at a position closely adjacent the gland member 66.

As the piston recedes from the snubbed position adjacent the inner gland member 66 the pressure in the working chamber 128 drops drastically and the check valve 130 therefore moves away from the sealing position into the location shown in FIGURE 2b. Since the shock absorber 10 is disposed in a vertical position the hydraulic fluid in the reservoir 24 is at a level 204 intermediate the ends of the outer casing 16. Accordingly it will be apparent that the passages 126 are in communication with an air column. Without the provision of the accumulator tube 134 it has been found that considerable cavitation occurs in the working chamber 128 thereby detrimentally affecting the characteristics of the shock absorber 10.

Since there is fluid communication between the first and second reservoir compartments 136, 138 at the lower end portion 141 of the accumulator tube 134, a decrease in the pressure in the working chamber 128 is transmitted to the first compartment 136 which causes the liquid therein to rise and flow through the passages 126. It will accordingly be seen that the accumulator tube 134 acts as a liquid standpipe to automatically deliver hydraulic liquid to the working chamber 128 in a manner much like a siphon. Thus it will be seen that the accumulator tube 134 cooperates with the check valve 130 and the passage 126 to constitute snub release means. When the piston 28 passes over the tapered portion 196 of the metering groove 190, there is sufficient hydraulic liquid bypassed through the passageway 202 to minimize liquid flow through the passages 126.

I claim:

1. A shock absorber for attachment to a vehicle in a generally up and down position, the shock absorber comprising:
   a cylinder assembly having a cylindrical body provided with passage means extending through one end portion;
   a piston assembly comprising a piston, slidably mounted within the cylindrical body, providing a central bore and passageway means from a location in the central bore to a working chamber between the piston and the one end portion of the cylinder assembly;
   means providing a liquid reservoir in communication with the passage means;
   means for metering flow through the piston comprising a metering pin carried by the cylinder assembly and extending through the central bore of the piston, the metering pin providing groove means having a tapered portion adjacent the one end of the one cylinder, an intermediate portion and a tapered portion adjacent the other end of the cylinder;
   means for snubbing the piston at the one end of the cylinder assembly against further movement theretoward, the snubbing means comprising aperture means in the cylindrical body adjacent the one end portion, the aperture means being in communication with the reservoir and disposed to be closed by the piston; and
   means for releasing the piston for movement toward a position intermediate the ends of the cylinder assembly, the releasing means comprising:
      a valve assembly operatively associated with the passage means to allow flow from the reservoir to the cylinder assembly when the pressure in the reservoir exceeds the pressure in the working chamber;
      a divider separating the reservoir into a first compartment in communication with the passage means and a second compartment;
      the first and second compartments being in communication with each other below the liquid level in the reservoir.

2. The shock absorber of claim 1 wherein:
   the means providing a liquid reservoir comprises a casing surrounding the cylindrical body; and
   the divider comprises a tube surrounding the cylindrical body and disposed generally concentrically between the casing and the cylindrical body.

3. The shock absorber of claim 1 wherein:
   the tapered portion of the groove means adjacent the upper end portion of the cylinder terminates at a location where the piston passes thereover prior to closing the aperture means.

4. A shock absorber for attachment to a vehicle in a generally up and down direction, the shock absorber comprising:
a cylinder assembly having:
an outer casing;
an inner cylinder concentrically disposed with respect to the outer casing and defining a reservoir therebetween, the inner cylinder providing aperture means at the upper portion thereof in communication with the reservoir;
an upper gland assembly providing a central bore for receiving a piston rod, the gland assembly providing passage means between the reservoir and the inner cylinder;
a piston assembly comprising:
a piston slidably mounted within the inner cylinder;
a piston rod, rigid with the piston, extending through the central bore of the gland assembly;
the piston and piston rod providing a central bore;
the piston providing passageway means from a working chamber between the upper end portion of the cylinder and a location in the piston bore intermediate the faces of the piston;
a metering arrangement comprising:
a metering pin, rigid with the cylinder assembly, extending into the central bore of the piston;
the metering pin providing generally longitudinally extending groove means on the periphery thereof, the groove means having a tapered portion adjacent the upper end portion of the cylinder assembly terminating below the aperture means; and
means for releasing the piston for movement away from the upper end portion of the cylinder after the piston has been snubbed by the closing of the aperture means by the piston, the piston releasing means comprising:
a pressure operated valve assembly operatively arranged with the passage means to allow flow from the reservoir to the cylinder assembly when the pressure in the reservoir exceeds the pressure in the working chamber;
a tube disposed generally concentrically between the outer casing and inner cylinder and dividing the reservoir into a first compartment in communication with the passage means and a second compartment;
the first and second compartments being in communication with each other below the liquid level in the reservoir.

5. The shock absorber of claim 4 wherein:
the pressure operated valve assembly comprises:
an annular lip rigid with the inner cylinder and adjacent the upper end portion thereof, the lip being disposed between the aperture means and the gland assembly; and
a movable annular valve disk having a central bore receiving the piston rod, the valve disk being disposed between the lip and the gland assembly.

6. A shock absorber of the hydraulic type for attachment to a vehicle in a generally up and down position, the shock absorber comprising:
a cylinder assembly having:
an outer casing;
an inner cylinder rigid with the outer casing and generally concentrically disposed therein to define a reservoir therebetween, the inner cylinder having aperture means at the upper portion thereof in communication with the reservoir;
an upper gland assembly rigid with the inner casing and the inner cylinder, the gland assembly providing a central bore for receiving a piston rod and further providing passage means between the inner cylinder and the reservoir;
a piston assembly comprising:
a piston slidably mounted within the inner cylinder;
a piston rod, rigid with the piston, extending through the central bore of the gland assembly;
the piston and piston rod providing a central bore;
the piston providing passageway means from a working chamber between the upper end portion of the cylinder and a location in the piston bore;
a metering arrangement comprising:
a metering pin, rigid with the cylinder assembly, extending through the central bore of the piston and piston rod throughout the extent of the piston movement;
the metering pin providing generally longitudinally extending groove means on the periphery thereof, the groove means having a tapered portion adjacent the upper end portion of the cylinder assembly terminating below the aperture means; and
means for releasing the piston for movement away from the upper end portion of the cylinder after the piston has been snubbed by the closing of the aperture means by the piston, the piston releasing means comprising:
a valve assembly operatively arranged with the passage means to allow flow from the servoir to the cylinder assembly when the pressure in the resorvoir exceeds the pressure in the working chamber, the valve assembly comprising:
an annular lip rigid with the inner cylinder and adjacent the upper end portion thereof, the lip being disposed between the aperture means and the gland assembly; and
a movable annular valve disk having a central bore receiving the piston rod, the valve disk being disposed between the lip and the gland assembly.

7. A shock absorber for attachment to a vehicle in a generally up and down position, the shock absorber comprising:
a cylinder having passage means through one end portion;
a piston reciprocal within the cylinder and dividing same into a first chamber adjacent the one end thereof and a second chamber;
means providing a liquid reservoir in communication with the passage means;
means associated with the piston for metering flow therethrough in both directions of movement thereof;
means independent of the metering means for snubbing the piston at the one end of the cylinder against further movement theretoward;
means for releasing the piston from the one end of the cylinder for movement toward a position intermediate the ends thereof, the releasing means comprising:
a check valve assembly operatively associated with the passage means to allow flow from the reservoir to the first chamber when the pressure in the reservoir exceeds the pressure in the first chamber;
a divider separating the reservoir into a first compartment in communication with the passage means and a second compartment;
means placing the first and second compartments in communication with each other below the liquid level in the reservoir and allowing flow from the second compartment to the first compartment.

8. The shock absorber of claim 7 wherein:
the piston provides a central bore and passageway means from a location in the central bore to the first chamber; and
the metering means comprises a metering pin carried by the cylinder and extending through the central bore of the piston, the metering pin providing groove means having a tapered portion adjacent the one end of the cylinder, an intermediate portion and a tapered portion adjacent the other end of the cylinder.

9. The shock absorber of claim 7 wherein the snubbing means comprises aperture means in the cylinder adjacent the one end portion, the aperture means being in communication with the reservoir and disposed to be closed by the piston.

References Cited

UNITED STATES PATENTS

| | | | |
|---|---|---|---|
| 2,199,880 | 5/1940 | Elliott | 188—88 |
| 2,360,755 | 10/1944 | Boor. | |

FOREIGN PATENTS

| | | |
|---|---|---|
| 952,117 | 4/1949 | France. |
| 995,585 | 8/1951 | France. |
| 725,199 | 7/1942 | Germany. |

GEORGE E. A. HALVOSA, *Primary Examiner.*

U.S. Cl. X.R.

188—97, 100